April 26, 1949.   G. J. LEXA   2,468,634
RELAY CONTROL SYSTEM
Filed Aug. 29, 1946
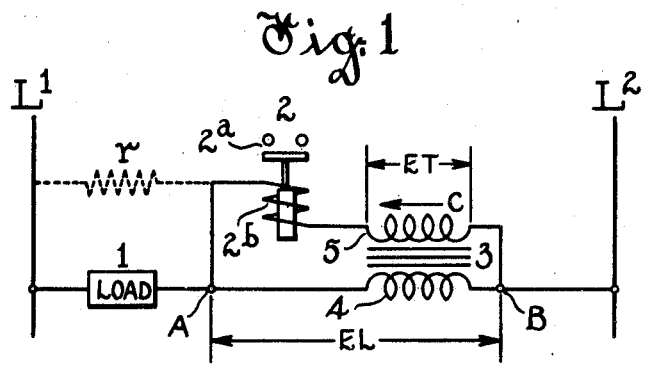
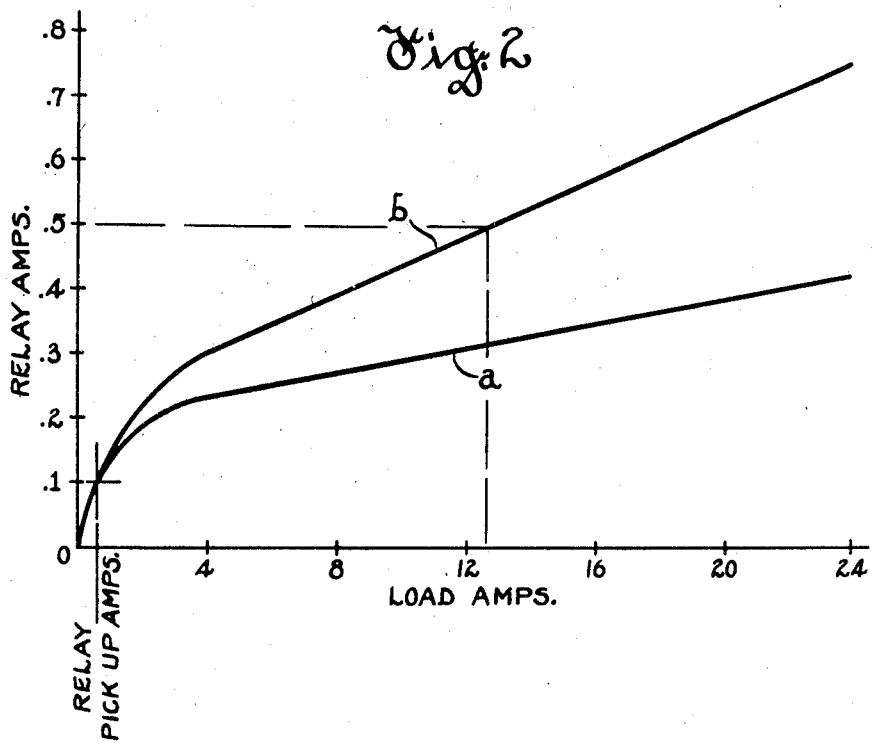
Inventor
George J. Lexa
By Frank H. Hubbard
Attorney Patented Apr. 26, 1949

2,468,634

UNITED STATES PATENT OFFICE 2,468,634

RELAY CONTROL SYSTEM

George J. Lexa, Wauwatosa, Wis., assignor to Cutler-Hammer, Inc., Milwaukee, Wis., a corporation of Delaware Application August 29, 1946, Serial No. 693,791

2 Claims. (Cl. 175—320)

This invention relates to relay control systems and is particularly applicable to alternating current control systems of the type including a load responsive relay.

Control systems of various types require a sensitive control relay which operates in response to a relatively low load current value in an A. C. circuit and is protected against overheating at much higher load current values in such circuit. Heretofore it has been common practice to subject a load relay to control by current conditions in an A. C. load circuit through the medium of a saturable transformer having its primary winding connected in series in the load circuit and its secondary winding connected directly across the operating winding of the load relay. With this arrangement the load relay can be readily designed to respond at a relatively low load current value in the A. C. circuit. However, it has been found that when this is done the current which is supplied to the relay at desired high current values in the load circuit is likely to be excessive and cause overheating thereof.

The present invention has among its objects to provide an improved control system of the aforesaid type in which a saturable transformer operates to effect response of the load relay at a relatively low load current value in the A. C. circuit, and to also insure against overheating thereof at much higher load current values in such circuit.

Various other objects and advantages of the invention will hereinafter appear.

The accompanying drawing illustrates an embodiment of the invention which will now be described, it being understood that the embodiment illustrated is susceptible of modification without departing from the spirit and scope of the appended claims.

In the drawing,

Figure 1 diagrammatically illustrates a load relay control system embodying the invention, and Fig. 2 is a diagram which graphically illustrates the operating characteristic of the system illustrated in Fig. 1.

Referring to Fig. 1, the same illustrates a control system including a variable load device 1 which is supplied with current from an alternating current circuit indicated by lines $L^1$, $L^2$. The system illustrated also includes a load relay 2 and control means therefor including a transformer 3.

As illustrated, relay 2 is provided with normally open contacts $2^a$ and an operating winding $2^b$, and transformer 3 has a saturable iron core upon which are wound a primary winding 4 and a secondary winding 5. In accordance with the present invention the primary winding 4 is connected across lines $L^1$, $L^2$ in series with the load device 1 and the secondary winding 5 is connected between points A and B on opposite sides of said primary winding in series with relay winding $2^b$. Also in accordance with the present invention transformer 3 is of step down current type and the core thereof is designed to saturate at a relatively low load current value in primary winding 4.

The operation of the aforedescribed system will now be more fully set forth in connection with Fig. 2. When current flows through the primary winding 4 in a direction from point A to point B in the load circuit a potential ET is induced in the secondary winding 5 which exceeds the potential EL across the points A and B and acts in opposition thereto. The relay winding $2^b$ is thus energized by current which flows in the direction of arrow C and is of a value corresponding to the difference between potentials ET and EL. It has been found that if transformer 3 has a step down current ratio of substantially 5 to 1 and is designed to saturate at a load current value in the neighborhood of 3 amperes the potential ET induced in the secondary winding 5 acts in opposition to the potential EL between points A and B in the load circuit to effect energization of relay winding $2^b$ by a current which varies substantially as illustrated by curve $a$ in Fig. 2 for load current values ranging from zero to 24 amperes in device 1. As is apparent from Fig. 2, if relay 2 is designed to operate at a current value of .1 ampere in its operating winding, the same will respond at a current value slightly in excess of .5 ampere in the load circuit. In practice it has been found that if the relay is designed to operate when subjected to a current value of .1 ampere the same is likely to overheat if subjected for a prolonged period to a current value in the neighborhood of .5 ampere. However, as is apparent from curve $a$ in Fig. 2, if the transformer 3 is designed as hereinbefore set forth the current supplied to the relay winding at a current value of 24 amperes in the load circuit will not exceed .5 ampere and will be insufficient to effect overheating of the relay.

As hereinbefore stated, prior to the present invention it was common practice to subject a load relay to control by current conditions in an A. C. load circuit through the medium of a saturable transformer having its primary winding connected in series in the load circuit, and its secondary winding connected directly across the operating winding of the load relay. By connecting the secondary winding of the above described transformer directly across the operating winding of relay 2 it was found that the current supplied to the relay varied as shown by curve $b$ in Fig. 2 for load current values ranging from zero to 24 amperes. As is apparent from curve $b$, this arrangement is likely to cause overheating of the relay at a current value slightly in excess of 12 amperes, whereas the arrangement shown in Fig. 1 permits a high load current value of 24 amperes without overheating of the relay.

In practice it has been found that due to residual magnetism the load relay sometimes sticks when the current in the load circuit is reduced to zero value. To insure against sticking of the relay a high resistance $r$ shown in dotted lines in Fig. 1 may be connected in shunt with the load device 1. With this resistance the relay is subjected to a small demagnetizing current to insure quick dropping out thereof under a no-load condition.

What I claim as new and desire to secure by Letters Patent is:

1. A relay control system comprising a variable load alternating current circuit, a relay having an operating winding, and means for controlling said relay to provide for response thereof at a relatively low load current value in said circuit, and to also prevent overheating thereof at relatively high load current values in said circuit, said means comprising a transformer having a primary winding connected in series in said load circuit and a secondary winding connected in shunt with said primary winding, and in series with the operating winding of said relay, said transformer being saturable at a relatively low current value in said load circuit and providing a potential across said secondary winding which exceeds the potential applied to said primary winding and acts in opposition thereto.

2. A relay control system comprising an alternating current circuit, a variable load device connected in said circuit, a relay having an operating winding, means for subjecting said relay to control by the current passing through said device to provide for response of said relay at a predetermined low load current value in said device and to permit relatively high load current values in said device without overheating of said relay, said means comprising a transformer having a primary winding connected in series with said device, and a secondary winding connected in shunt with said primary winding and in series with the operating winding of said relay, said transformer being saturable at a relatively low load current value in said load circuit, and providing a potential across said winding which exceeds the potential applied to said primary winding and acts in opposition thereto, and a leakage resistor connected in shunt with said variable load device to effect quick demagnetization of said relay winding upon a no load current condition in said device.

GEORGE J. LEXA.

REFERENCES CITED

The following references are of record in the file of this patent:

UNITED STATES PATENTS

| Number | Name | Date |
|---|---|---|
| 1,015,968 | Lehr | Jan. 30, 1912 |
| 1,041,641 | Lindquist | Oct. 15, 1912 |
| 1,077,319 | Tatum | Nov. 4, 1913 |
| 2,128,324 | Root | Aug. 30, 1938 |
| 2,303,581 | Rudd | Dec. 1, 1942 |